May 24, 1955  R. L. NAFZIGER  2,708,889
MEANS FOR PRACTICING REVERSE BAKING PROCESS
Filed May 25, 1953
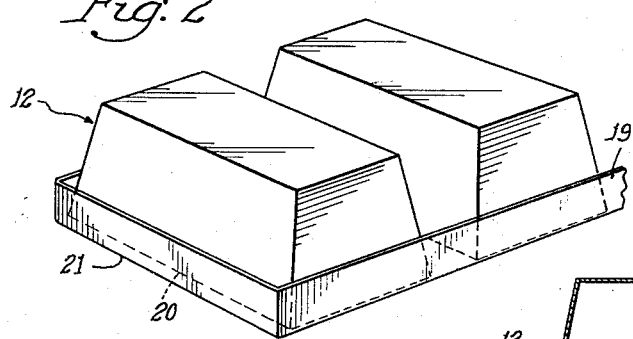
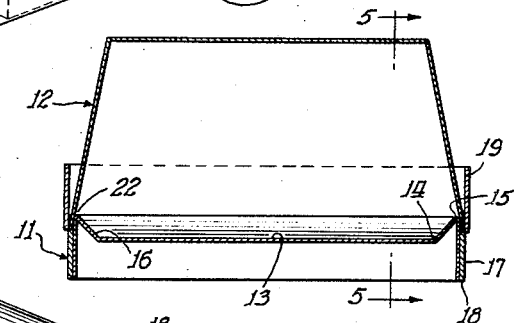
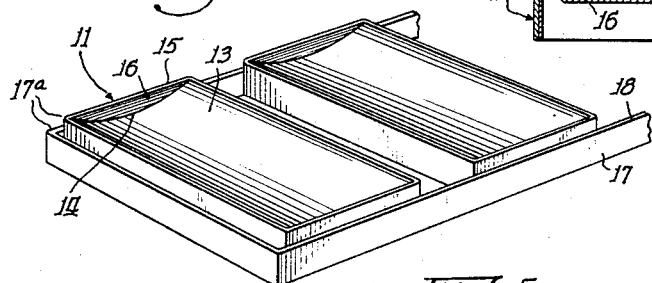
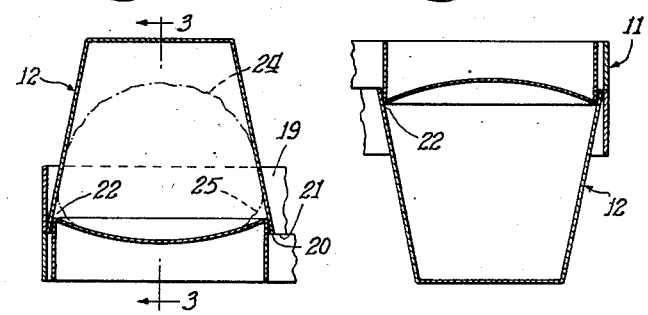
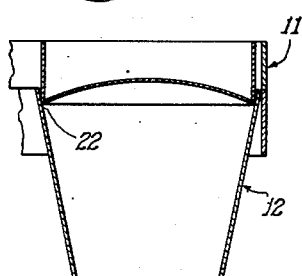
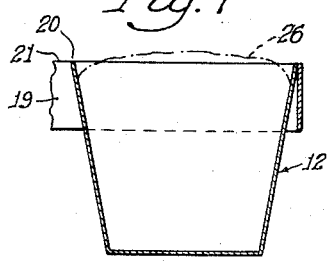
Inventor:
Ralph L. Nafziger
By Jones, Tesch + Darbo
Attys.

United States Patent Office 2,708,889
Patented May 24, 1955

2,708,889

MEANS FOR PRACTICING REVERSE BAKING PROCESS

Ralph L. Nafziger, Palm Springs, Calif.

Application May 25, 1953, Serial No. 356,988

2 Claims. (Cl. 107—7)

This invention relates to reverse baking means, more particularly for the baking of bread, and has as its principal object improvement in the quality of bread, it being especially adapted for the baking of bread by commercial bakeries.

In an important aspect, the present invention is an improvement on that of the Garrett Patent No. 2,061,149 of November 17, 1936. That patent describes and claims a method of baking comprising the steps of proofing a piece of dough on a tray while the dough is covered by an inverted bread pan, then reversing the bread pan after proofing, removing the tray, and baking the bread in the pan, from which process an improvement in the texture and crust of the bread is obtained, for reasons pointed out in my prior Patents Nos. 2,495,469 of January 24, 1950 and 2,583,870 of January 29, 1952. The method of baking just adverted to and here involved is designated the reverse baking process.

In the practice of the process hereinabove referred to, and particularly by the use of the means illustrated in said Garrett patent, difficulties have been encountered in controlling the action of the dough as it rises during the proofing process and as it affects the shape of the loaf ultimately produced. The present invention aims to solve those problems and to contribute importantly to the production of a loaf of bread which has not only the improved qualities resulting from the reverse baking process but which is also uniformly shapely and attractive in appearance.

Other objects and advantages will be apparent from the following description, taken together with the accompanying drawings, showing an illustrative embodiment of the invention, and in which drawings—

Figure 1 is a perspective view of one or more trays constructed in accordance with the present invention for the practice of the reverse baking process;

Figure 2 is a similar perspective view of one or more bread pans, shown in inverted position, for cooperation with the trays of Fig. 1;

Figure 3 is a longitudinal cross-section of an assembled tray and bread pan in position for proofing of the dough in accordance with the process, and being a section taken on the line 3—3 of Fig. 5 but without the dough being shown;

Figure 4 is a transverse section through one of the trays, with a piece of dough, preparatory for proofing, diagrammatically indicated thereon;

Figure 5 is a view similar to Fig. 4 showing an inverted bread pan assembled with the tray of Fig. 4 with the dough to be proofed indicated diagrammatically therein, and showing the dough partially risen during the proofing step;

Figure 6 shows the tray and bread pan reversed after the completion of the proofing step and in which stage the risen dough has completely filled the tray and bread pan;

Figure 7 shows the final step preparatory to the baking of the loaf and in which the tray has been removed from the bread pan and the bread pan with the risen dough therein is ready to be placed in the oven for baking; and Figure 8 indicates diagrammatically how a plurality, in this instance four, of the trays or bread pans may be ganged together in a frame for convenience in handling in a commercial bakery.

Referring in detail to the illustrative construction shown in the drawings, the numeral 11 represents one of the trays of the present invention which may be of metal and rectangular in shape and slightly smaller in overall dimension than the mouth of the bread pan to be associated therewith for the purposes of the present invention, one of which bread pans is indicated at 12.

In accordance with the present invention, the tray is of concave formation as indicated at 13, the concavity or trough 13 in this instance being defined by an arc 14 of relatively large radius so that the tray while concave is somewhat shallow in this respect. It will be noted that the arc 14 intersects the upper edge 15 of the tray. At each end, the tray has an inclined portion 16 which fills the space between the edge 15 and the arc 14 between the corners of the tray.

A number of the trays 11, say four as here indicated, are grouped or ganged together by means of a rectangular frame 17 within which the trays are located abreast and to which the trays are secured at their ends so that a plurality of the trays are carried by the frame. Following the present invention, and for the purpose more particularly later described, the edge 15 of each tray extends above the edge 18 of the frame 17 so that there is a step or shoulder 17a between the upper edges of the trays and the upper edge of the frame.

Bread pans 12 may be generally conventional having diverging sides as shown, and a number of such pans, in this instance four, corresponding in number with the number of the trays 11, are carried by a pan frame 19 which is also rectangular and to which the pans are attached at their ends. Again following the present invention, pans are secured in the frame 19 so that their edges 20 (which edge defines the mouth of the pan in each case) are flush with the edge 21 of the frame 19. The overall area of the tray 11 as defined by its edges 15 is just slightly smaller than the overall area of the mouth of the pan 12 as defined by the edges 20 of the latter. The frames both 17 and 19 define approximately equal areas or areas sufficiently larger than the over-all area of the trays so that the frame 19 may be superposed onto frame 17 in registry therewith. When this is done each tray 11 of the frame 17 will be received within a corresponding inverted bread pan 12 of the frame 19, the trays and pans being spaced apart in their respective frames so that they will so register. At the same time, by reason of the step 17a, the tray 11 will be slightly telescoped within its complementary pan 12 as best seen in Figs. 3 and 5, from which figures, and also from Fig. 6, it will be seen how the tray is partially telescoped within the pan so that the mouth of the pan overlaps the edge 15 of the tray to an appreciable extent, but in engagement or snugly therewith, as at 22, the frame 19 resting on the shoulder 17a.

In practice the invention is utilized as follows:

Turning first to Fig. 4, a piece or lump of dough, indicated diagrammatically at 23, is placed in one of the trays 11 and normally in each of the trays of a gang carried by a frame 17. Thereupon, as shown in Fig. 5, the bread pans are placed in inverted position over the trays and so that the upper edge of the tray is telescoped slightly within the pan. During the time of the proofing interval the lump of dough 23 will begin to rise as indicated diagrammatically at 24. During such rising, and by reason of the overlap of the pan mouth about the edges of the tray, the dough 24, while being confined by the pan and tray, will rise free of the edges of the pan, as indicated at 25, and there will not be a tendency, which would otherwise occur, for the dough to creep under the edge of the pan and spoil the loaf.

When the proofing step is completed, with the pan still inverted as in Fig. 5, the dough will have completely filled the tray and pan. The parts are then reversed, as indicated in Fig. 6, so that the pan is now upright and the tray inverted, and the tray is removed from the pan for baking of the bread in the pan. By reason of the overlap of the inverted pan on the tray during proofing, the loaf is well shaped.

Finally, as shown in Fig. 7, the pan is ready to be placed into the oven for baking, the dough having now risen somewhat as indicated at 26. It will be seen that the dough has a crown or round top by reason of the concavity 13 of the tray 11, this concavity having been at the bottom while the dough was being proofed, but being now at the top after reversing, so that after such reversal, the pan 12 carries the loaf therein with a round top thereon such as it would have if the dough had been placed initially in the pan in the conventional position of the latter, while at the same time the improved results hereinabove mentioned are obtained, and also pointed out in the aforesaid prior patents, as to the reverse baking process.

Changes and modifications may be availed of within the spirit and scope of the invention as defined in the hereunto apended claims.

What is here claimed is:

1. Means of the class described, comprising, a first frame, a plurality of trough-shape trays carried by and arranged horizontally abreast within said frame, said trays having edges extending above the said first frame, a second frame approximating in area and supported on the first frame, a plurality of inverted bread pans carried by and arranged horizontally abreast within said second frame corresponding in number and resgistering with the said trays, the trays being of smaller overall area than the mouths of the pans and said pans having their mouths below the edges of the trays, whereby the said second frame may be placed in registry with and superposed on the first frame with the pans inverted and each tray is entered into a pan respectively in partially telescoped relation.

2. Means of the class described, comprising, a first frame, a plurality of trough-shape trays carried by and within said frame, said trays having edges extending above the said first frame, a second frame approximating in area and resting on the first frame, a plurality of inverted bread pans having diverging sides carried by and within said second frame corresponding in number and registering with the said trays, said pans having their mouths substantially flush with the said second frame and with the upper edges of the first frame, the trays being of smaller overall area than the mouths of the pans, whereby the said second frame may be placed in registry with and superposed on the first frame with the pans inverted and each tray is entered into a pan respectively in partially telescoped relation.

References Cited in the file of this patent

UNITED STATES PATENTS

| | | |
|---|---|---|
| 563,675 | Mullins | July 7, 1896 |
| 776,776 | Dietz | Dec. 6, 1904 |
| 2,061,149 | Garrett | Nov. 17, 1936 |